(12) United States Patent
Nishizawa et al.

(10) Patent No.: US 10,903,736 B2
(45) Date of Patent: Jan. 26, 2021

(54) POWER CONVERTER

(71) Applicant: Hitachi Automotive Systems, Ltd., Hitachinaka (JP)

(72) Inventors: Youhei Nishizawa, Hitachinaka (JP); Kaname Sasaki, Hitachinaka (JP); Yutaka Okubo, Hitachinaka (JP); Yuki Fujita, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/518,695

(22) Filed: Jul. 22, 2019

(65) Prior Publication Data

US 2020/0007026 A1 Jan. 2, 2020

Related U.S. Application Data

(63) Continuation of application No. 16/211,346, filed on Dec. 6, 2018, now Pat. No. 10,404,156, which is a (Continued)

(30) Foreign Application Priority Data

Jun. 6, 2014 (JP) ................................ 2014-117510

(51) Int. Cl.
*H02M 1/14* (2006.01)
*H02M 7/00* (2006.01)
(Continued)

(52) U.S. Cl.
CPC .............. *H02M 1/14* (2013.01); *B60L 53/20* (2019.02); *H02M 7/003* (2013.01); *H02M 7/537* (2013.01);
(Continued)

(58) Field of Classification Search
CPC ........ H02M 5/40; H02M 5/42; H02M 7/7575; H02M 5/458; H02M 5/45; H02M 5/4505;
(Continued)

(56) References Cited

U.S. PATENT DOCUMENTS 9,769,962 B2 9/2017 Huang
2004/0257841 A1 12/2004 Taguchi
(Continued)

FOREIGN PATENT DOCUMENTS

| JP | 2007-143272 A | 6/2007 |
| JP | 2009-038961 A | 2/2009 |
| JP | 2012-152104 A | 8/2012 |

*Primary Examiner* — Nguyen Tran
(74) *Attorney, Agent, or Firm* — Foley & Lardner LLP

(57) ABSTRACT

There is provided a power converter which can suppress a surge voltage and reduce noise flowing from an input of a power changer.

The power converter includes an inverter circuit 140, a capacitor 514 for smoothing DC power, a capacitor 515 for removing noise, and conductors 564p and 564n. The conductors 564p and 564n are connected to the capacitors 514 and 515 when power side terminals 562p and 562n are connected to an inverter circuit 140, and power source side terminals 561p and 561n are connected to a battery 136. In the conductors 564p and 564n, a parasitic inductance L1 between capacitor terminals 563p and 563n and capacitor terminals 560p and 560n is larger than a parasitic inductance L2 between capacitor terminals 563p and 563n and the power side terminals 562p and 562n.

8 Claims, 12 Drawing Sheets

Related U.S. Application Data continuation of application No. 15/859,994, filed on Jan. 2, 2018, now Pat. No. 10,181,783, which is a continuation of application No. 15/308,271, filed as application No. PCT/JP2015/063404 on May 11, 2015, now Pat. No. 9,893,603.

(51) Int. Cl.
  *B60L 53/20* (2019.01)
  *H02M 7/537* (2006.01)
  *H02M 1/44* (2007.01)
  *H02M 7/5387* (2007.01)
  *H02M 1/34* (2007.01)

(52) U.S. Cl.
  CPC .......... *H02M 1/44* (2013.01); *H02M 7/53871* (2013.01); *H02M 2001/346* (2013.01); *Y02B 70/10* (2013.01); *Y10S 903/907* (2013.01)

(58) Field of Classification Search
  CPC .... H02M 5/451; H02M 5/452; H02M 5/4585; H02M 1/12; H02M 1/4266; H02M 2001/123; H02M 1/14; H02M 7/05; H02M 7/003; H02H 7/268; H02J 3/36; H02J 3/01; G09G 3/20; H01R 13/6675; H01R 29/00; H01R 31/065
  USPC .................. 363/34, 35, 37, 39–41, 146, 147
  See application file for complete search history.

(56) References Cited

U.S. PATENT DOCUMENTS

| | | |
|---|---|---|
| 2007/0109715 A1 | 5/2007 | Azuma et al. |
| 2009/0010029 A1 | 1/2009 | Mizukoshi et al. |
| 2009/0040724 A1 | 2/2009 | Nishikimi |
| 2010/0328975 A1 | 12/2010 | Hibino et al. |
| 2011/0249421 A1 | 10/2011 | Matsuo |
| 2014/0226376 A1 | 8/2014 | Hayashiguchi |
| 2014/0321171 A1* | 10/2014 | Fujita ...................... H02M 1/14 363/37 |

* cited by examiner

POWER CONVERTER

CROSS-REFERENCE TO RELATED APPLICATIONS

The present application is a continuation of U.S. patent application Ser. No. 16/211,346 filed Dec. 6, 2018, which is a continuation of U.S. patent application Ser. No. 15/859,994 filed Jan. 2, 2018, which is a continuation of U.S. patent application Ser. No. 15/308,271 filed Nov. 1, 2016, which is a U.S. National Stage of PCT/JP2015/063404, filed on May 11, 2015, and claims priority to Japanese Patent Application no. 2014-117510 filed Jun. 6, 2014. The disclosures of the prior applications are incorporated by reference herein in their entirety.

TECHNICAL FIELD

The present invention relates to a power converter for converting DC power into AC power or converting DC power into AC power.

BACKGROUND ART

Generally, a power converter includes a capacitor module for smoothing DC power, an inverter circuit for converting between DC power and AC power, and a control circuit for controlling the inverter circuit. In recent years, it is desired to miniaturize the power converter. Especially, in fields of a hybrid vehicle and an electric vehicle, it is desired to mount a power converter in the smallest space especially in an engine room outside of a cabin, and therefore further downsizing is required to improve mountability to a vehicle.

Further, an operating time and an operating condition (a high output torque condition) of a motor to be used as a driving source are likely to be expanded, and it is simultaneously required to increase a current and a voltage for power conversion. As a result, an instantaneous voltage increase (a surge voltage) is actualized which is generated when a power semiconductor element forming an inverter circuit performs switching operation.

A surge voltage level depends on a product of a parasitic inductance value between a capacitor module and a power semiconductor element and a current change during switching. Therefore, a technique described in PTL 1 suppresses a surge voltage by lowering an inductance of a bus bar. Further, noise flowing in a power converter is reduced by connecting a capacitor for removing noise to an input-side power source terminal,

CITATION LIST

Patent Literature

PTL 1: JP 2012-152104 A

SUMMARY OF INVENTION

Technical Problem

It is concerned that, in addition to the above-described noise current flowing into a power converter from a vehicle body, a battery, which is a power source, and a peripheral electric circuit are adversely affected since a voltage change caused by a surge voltage is generated in a power source terminal of a capacitor module and flows out as conductive noise/radiation noise from an input of the power converter.

Solution to Problem

A power converter according to the present invention includes a power converting unit, a first capacitor, a second capacitor, and a conductor. The power converting unit includes a plurality of semiconductor switching elements and converts power between DC power and AC power. The first capacitor smoothes DC power from a DC power source. The second capacitor removes noise. The conductor includes a positive electrode conductor material and a negative electrode conductor material of which one ends are connected to the power converting unit, and another ends are connected to the DC power source. The conductor includes a first connecting portion and a second connecting portion. The first connecting portion is provided on the one end side and connected to the first capacitor. The second connecting portion is provided on the another end side and connected to the second capacitor. A first parasitic inductance of the conductor between the first connecting portion and the second connecting portion is larger than a second parasitic inductance of the conductor between the first connecting portion and the one end.

Advantageous Effects of Invention

According to the present invention, a surge voltage can be suppressed, and noise flowing from an input of a power converter can be reduced.

DESCRIPTION OF EMBODIMENTS

Figure 1:
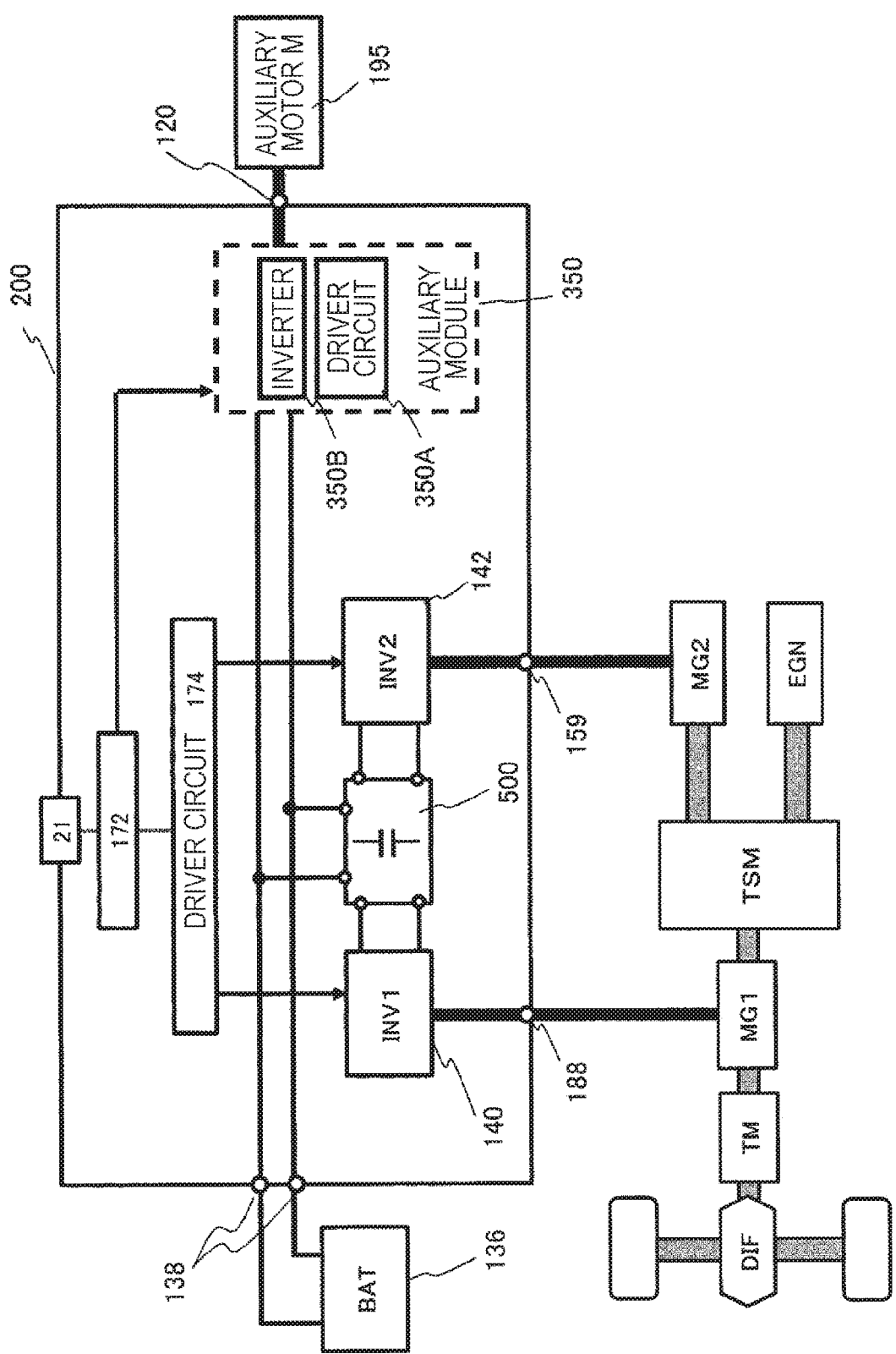
FIG. 1 is a diagram indicating a schematic configuration of a hybrid vehicle mounting a power converter according to embodiments of the present invention.

Embodiments of the present invention will be described below with reference to drawings. A power converter according to the present invention is, for example, mounted in an electric vehicle such as a hybrid vehicle and an electric automobile. FIG. 1 is a diagram indicating a schematic configuration of a hybrid vehicle mounting a power converter according to embodiments of the present invention.

In the hybrid vehicle indicated in FIG. 1, an engine EGN and rotary electric machines MG1 and MG2 generate a traveling torque of a vehicle. The rotary electric machines MG1 and MG2 function as a motor generator and convert mechanical energy applied from outside into power. An output torque on an output side of the engine EGN and an output torque of the rotary electric machine MG2 are transmitted to the rotary electric machine MG1 via a power distribution mechanism TSM. A rotation torque from the power distribution mechanism TSM or a rotation torque generated by the rotary electric machine MG1 is transmitted to wheels via a transmission TM and a differential gear DIF.

During regenerative braking, a rotation torque is transmitted from wheels to the rotary electric machine MG1, and AC power is generated based on the supplied rotation torque. The AC power is converted into DC power by the power converter 200, a battery 136 for high voltage is charged, and the charged power is reused as traveling energy. Further, in the case where power stored in the battery 136 for high voltage is decreased, rotational energy of the engine EGN is converted into AC power by the rotary electric machine MG2, and the battery 136 is charged by converting the AC power into DC power by the power converter 200. Mechanical energy is transmitted from the engine EGN to the rotary electric machine MG2 by the power distribution mechanism TSM.

The power converter 200 includes inverter circuits 140 and 142, a control circuit 172, a driver circuit 174, a capacitor module 500, and an auxiliary module 350. The inverter circuit 140 converts DC power into AC power to drive the rotary electric machine MG1 and is connected to the rotary electric machine MG1 by an AC connector 188. The inverter circuit 142 converts DC power into AC power to drive the rotary electric machine MG2 and is connected to the rotary electric machine MG2 by an AC connector 159. A conductor disposed between the inverter circuits 140 and 142 and the battery 136 is connected to the capacitor module 500 to smooth DC power to be supplied to the inverter circuits 140 and 142. The conductor is connected to the battery 136 by a DC connector 138.

A driver circuit 350A and an inverter circuit 350B are provided to the auxiliary module 350. The driver circuit 350A generates a driving pulse to control the inverter circuit 350B based on a control pulse generated by the control circuit 172. The inverter circuit 350B converts DC power of the battery 136 into AC power to drive an auxiliary motor 195. The AC power is output to the auxiliary motor 195 via an AC terminal 120. Examples of the auxiliary motor 195 include a motor to drive a compressor of an air conditioner and an auxiliary motor to drive a hydraulic pump for cooling.

The control circuit 172 calculates control amounts of the rotary electric machines MG1 and MG2 and the auxiliary motor 195 based on a command input from a host controller (not illustrated) via a connector 21. Further, the control circuit 172 calculates whether to drive as a motor or as a power generator and generates a control pulse based on the calculation result. Each control pulse is input to the driver circuit 174 and the driver circuit 350A of the auxiliary module 350 described above. The driver circuit 174 generates a driving pulse to control each of the inverter circuits 140 and 142 based on a control pulse generated by the control circuit 172.

Figure 2:
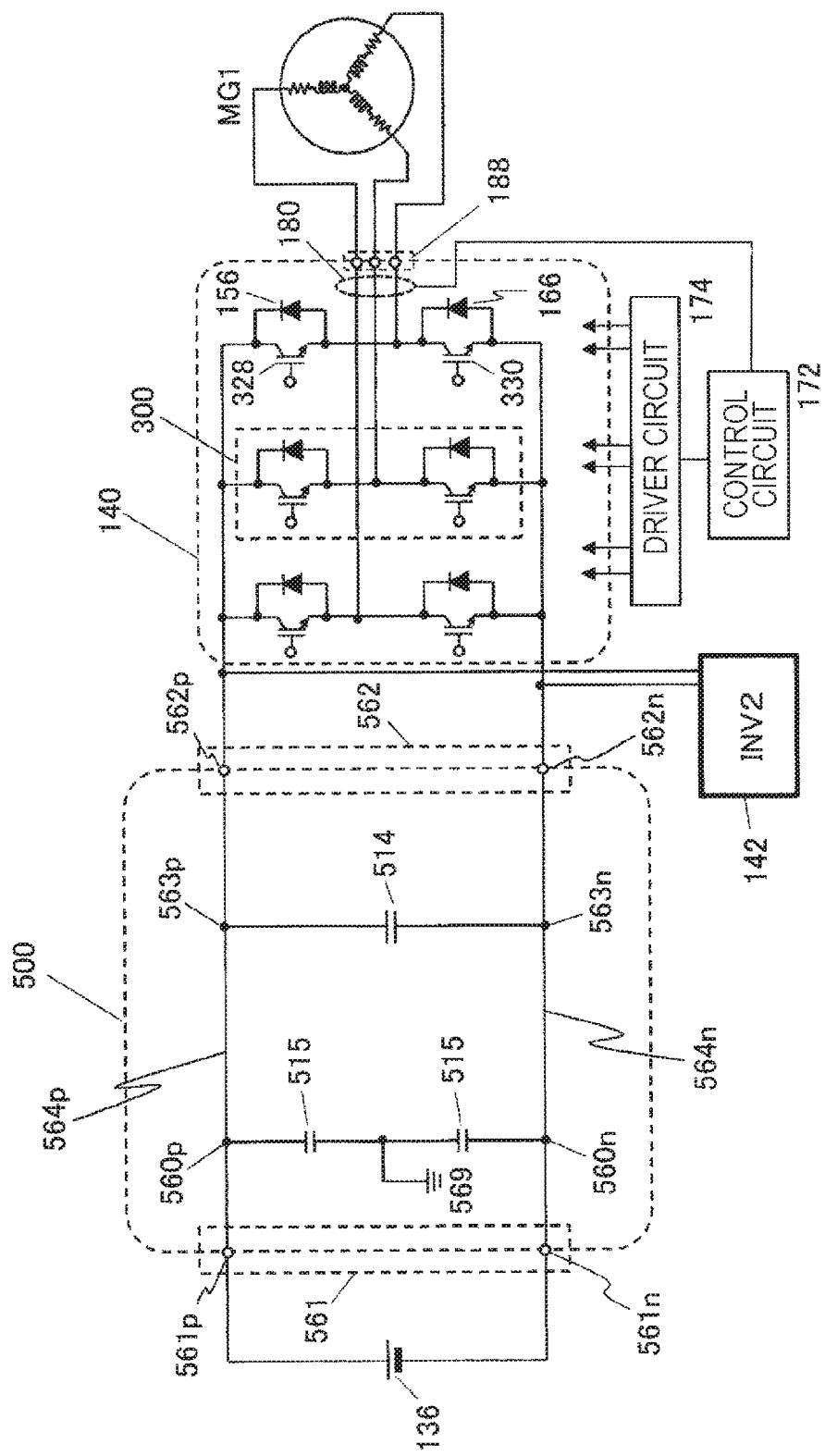
FIG. 2 is a block diagram illustrating a schematic configuration of a part related to driving control of a rotary electric machine MG1 in a power converter 200.

FIG. 2 is a block diagram illustrating a schematic configuration of a part related to drive control of a rotary electric machine MG1 in a power converter 200. The inverter circuit 140 includes a plurality of switching power semiconductor elements. In the embodiments described herein, an insulated gate-type bipolar transistor is used as the switching power semiconductor element and will be denoted by IGBT. The inverter circuits 140 and 142 have a same configuration, and the inverter circuit 140 will be described as an example below.

The inverter circuit 140 includes three power modules 300 corresponding to three phases including U, V, and W phases of AC power to be output. Each of the power modules 300 forms a series circuit of upper and lower arms including an IGBT 328 and a diode 156 which operate as an upper arm and the IGBT 330 and a diode 166 which operate as a lower arm. In each of the power modules 300, a middle point of each of the series circuits is connected to the rotary electric machine MG1 via the AC connector 188. A metal-oxide-semiconductor field-effect transistor (hereinafter abbreviated as MOSFET) may be used as a switching power semiconductor element. In this case, the diode 156 and the diode 166 are not needed.

The control circuit 172 includes a microcomputer for calculating a switching timing of the IGBTs 328 and 330. Input information to the microcomputer includes a target torque value requested to the rotary electric machine MG1, a current value to be supplied to the rotary electric machine MG1 from each power module 300, and a magnetic pole position of a rotor of the rotary electric machine MG1. The target torque value is based on a command signal output from an upper control device (not illustrated).

A current value is detected based on a detection signal by a current sensor 180. A magnetic pole position is detected based on a detection signal output from a rotation magnetic pole sensor (not illustrated) such as a resolver provided to the rotary electric machine MG1. In the embodiment, a case is exemplified where the current sensor 180 detects current values of three phases. However, current values for two phases may be detected, and currents for three phases may be calculated.

As described above, the control circuit 172 receives a control command from an upper control device via the connector 21 (refer to FIG. 1). Based on the control command, the control circuit 172 generates a control pulse which is a control signal to control the IGBTs 328 and 330 forming an upper arm or a lower arm of the power module 300 of each phase forming the inverter circuit 140 and supplies the control pulse to the driver circuit 174.

Based on the above-described control pulse, the driver circuit 174 supplies a drive pulse to control the IGBTs 328 and 330 forming an upper arm or a lower arm of the power module 300 of each phase to the IGBTs 328 and 330 of each phase. The IGBTs 328 and 330 convert DC power supplied from the battery 136 into three-phase AC power by conducting or cutting off power based on the drive pulse from the driver circuit 174, and the converted power is supplied to the rotary electric machine MG1.

The battery 136 and the inverter circuit 140 are connected by two conductors 564p and 564n. The conductor 564p connects a positive electrode side of the battery 136 and a positive electrode side of the inverter circuit 140, and the conductor 564n connects a negative electrode side of the battery 136 and the negative electrode side of the inverter circuit 140. The battery 136 is connected to power source side terminals 561p and 561n of the conductors 564p and

564n. The inverter circuit 140 is connected to power side terminals 562p and 562n of the conductors 564p and 564n.

A smoothing capacitor 514 is connected to capacitor terminals 563p and 563n of the conductors 564p and 564n. Further, a capacitor 515 for removing noise is connected to capacitor terminals 560p and 560n disposed between the power source side terminals 561p and 561n and the capacitor terminals 563p and 563n. The capacitor 515 is also called a Y capacitor and releases common mode noise to a ground 569.

Figure 3:
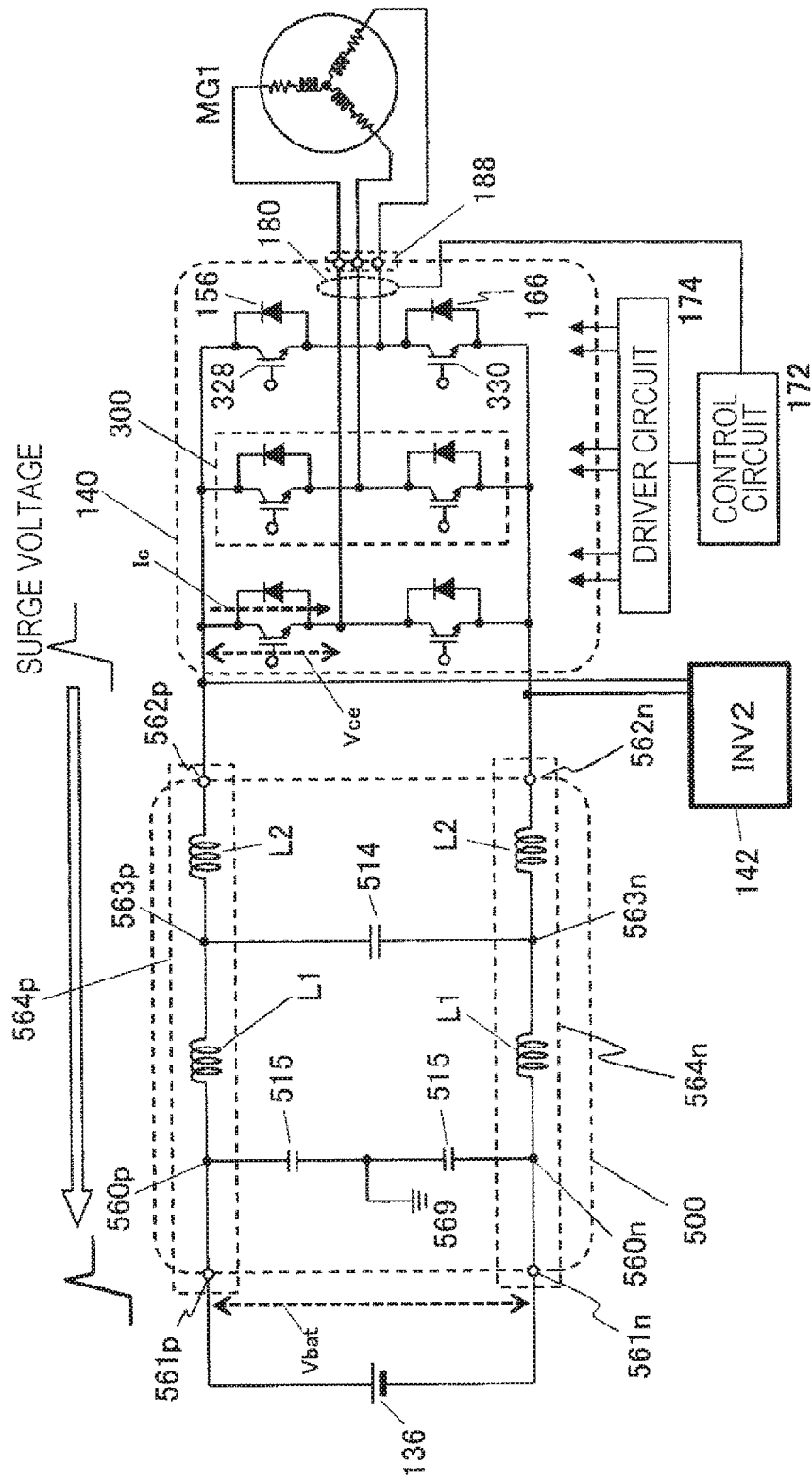
FIG. 3 is a diagram describing a relation among parasitic inductances L1 and L2, a surge voltage, and noise outflow.

A configuration to suppress a surge voltage and a configuration to reduce noise flowing from an input of a power converter according to the embodiment will be described next. FIG. 3 is a block diagram as in FIG. 2. In FIG. 3, parasitic inductances in the conductors 564p and 564n related to a surge voltage and noise outflow are denoted by L1 and L2.

Suppression of Surge Voltage

Figure 4:
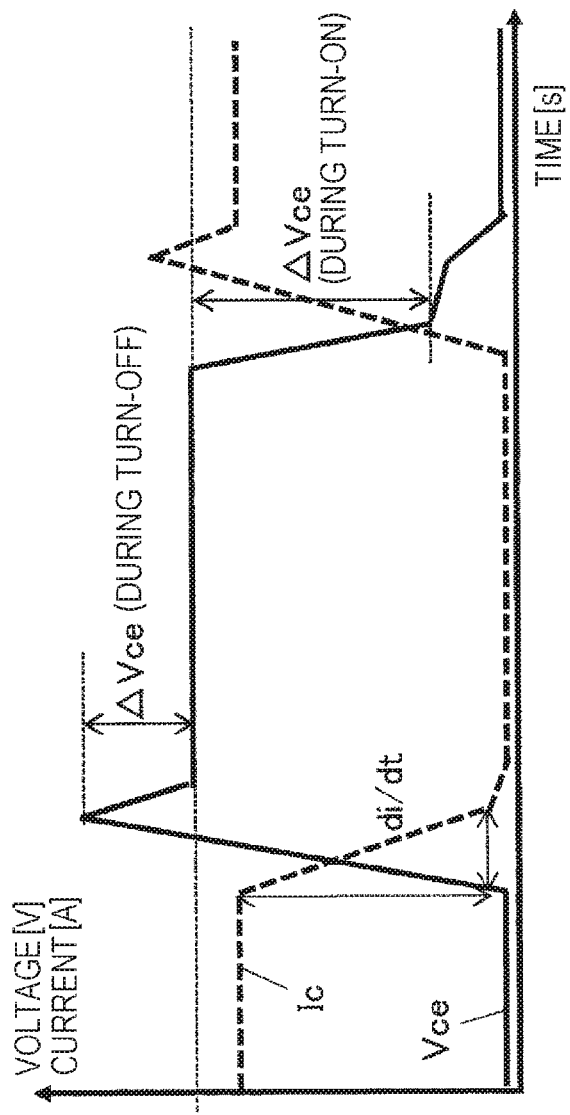
FIG. 4 is a diagram describing the surge voltage.

It is concerned that a power semiconductor element is broken by the occurrence of a surge voltage, and noise current is caused by a voltage change due to a surge voltage at both ends of a parasitic capacitance of a power converter, and the noise current flows in a vehicle body. Further, the noise current affects noise flowing from an input of the power converter, which will be described later. FIG. 4 is a diagram describing a surge voltage. In FIG. 4, Vce of the IGBT 328 indicates a voltage between a collector and an emitter, and Ic indicates a collector current. The following formula (1) indicates a surge voltage ΔVce which is generated between a collector terminal and an emitter terminal of the upper arm IGBT 328 of the power module 300.

$$\Delta Vce = (L2 + Lp) \times (di/dt) \quad (1)$$

In the formula (1), L2 indicates a parasitic inductance between the capacitor terminal 563p (563n) and the power side terminal 562p (562n), Lp indicates a parasitic inductance of the power module 300, and (di/dt) indicates a current change when the upper arm IGBT 328 is switched. In the embodiment, by using the conductors 564p and 564n having a structure to be described later, the parasitic inductance L2 in the formula (1) is reduced, and the surge voltage ΔVce is suppressed.

Reduction in Noise Flowing from Input of Power Converter

Figure 5:
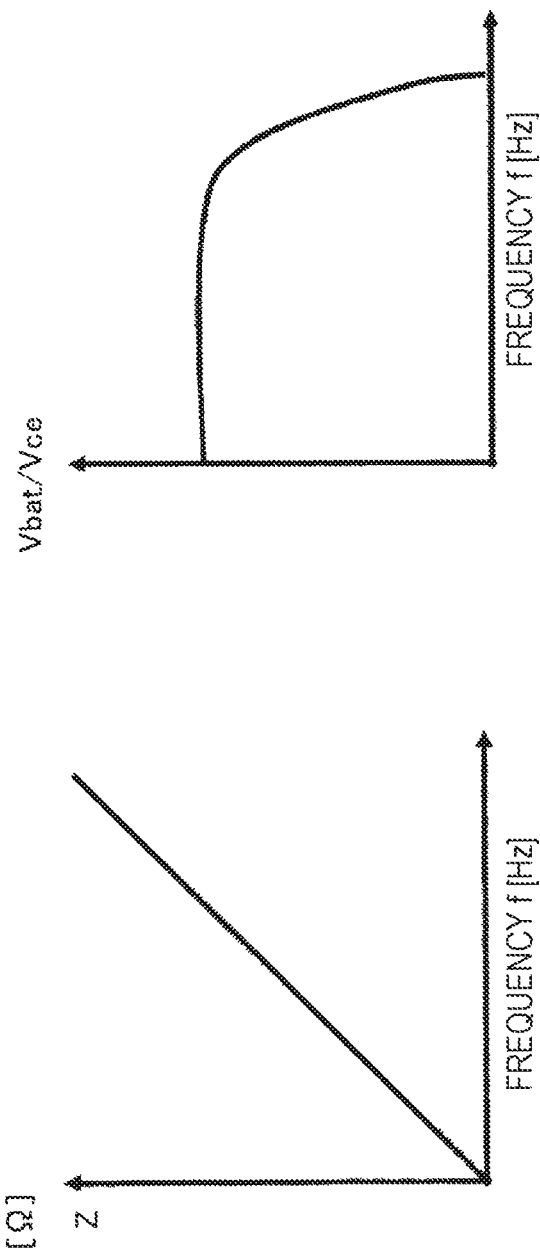
FIG. 5A is a diagram describing a reduction in the noise outflow.
FIG. 5B is a diagram describing a reduction in the noise outflow.

A method for reducing noise flowing from an input of a power converter will be described next with reference to FIGS. 3 and 5. With generation of the surge voltage described above, a voltage Vbat of the power source side terminals 561p and 561n of the conductors 564p and 564n has a voltage change. It is concerned that the voltage change flows from an input of the power converter as conductive noise and radiation noise and is adversely affected to the battery 136, which is a power source, and a peripheral electric circuit since.

In the embodiment, to suppress the voltage change, the parasitic inductance L1 in the conductors 564p and 564n, in other words, a parasitic inductance from the capacitor terminal 560p (560n) of the capacitor 515 for removing noise to the capacitor terminal 563p (563n) of the capacitor 514, is increased. An impedance Z(=jωL1, j: a complex number, ω: an angle speed) by the parasitic inductance L1 increases as a frequency is increased as indicated in FIG. 5A. Consequently, the parasitic inductance L1 functions as a low frequency band path filter (LPF), and a change in the voltage Vbat (see FIG. 5B) of the power source side terminal 561p (561n) in association with a surge voltage which is a change in a high frequency voltage is blocked.

As described above, according to the embodiment, in the conductors 564p and 564n, the parasitic inductance L2 from the power side terminal 562p (562n) to the capacitor terminal 563p (563n) is decreased, and the parasitic inductance L1 from the capacitor terminal 563p (563n) to the capacitor terminal 560p (560n) is increased. As a result, generation of a surge voltage is prevented, and noise flowing from an input of the power converter in association with the generation of a surge voltage is reduced. Specifically, the conductors 564p and 564n are formed so as to be L2<L1.

The conductors 564p and 564n satisfying the above-described conditions will be described below in detail.

First Embodiment

Figure 6:
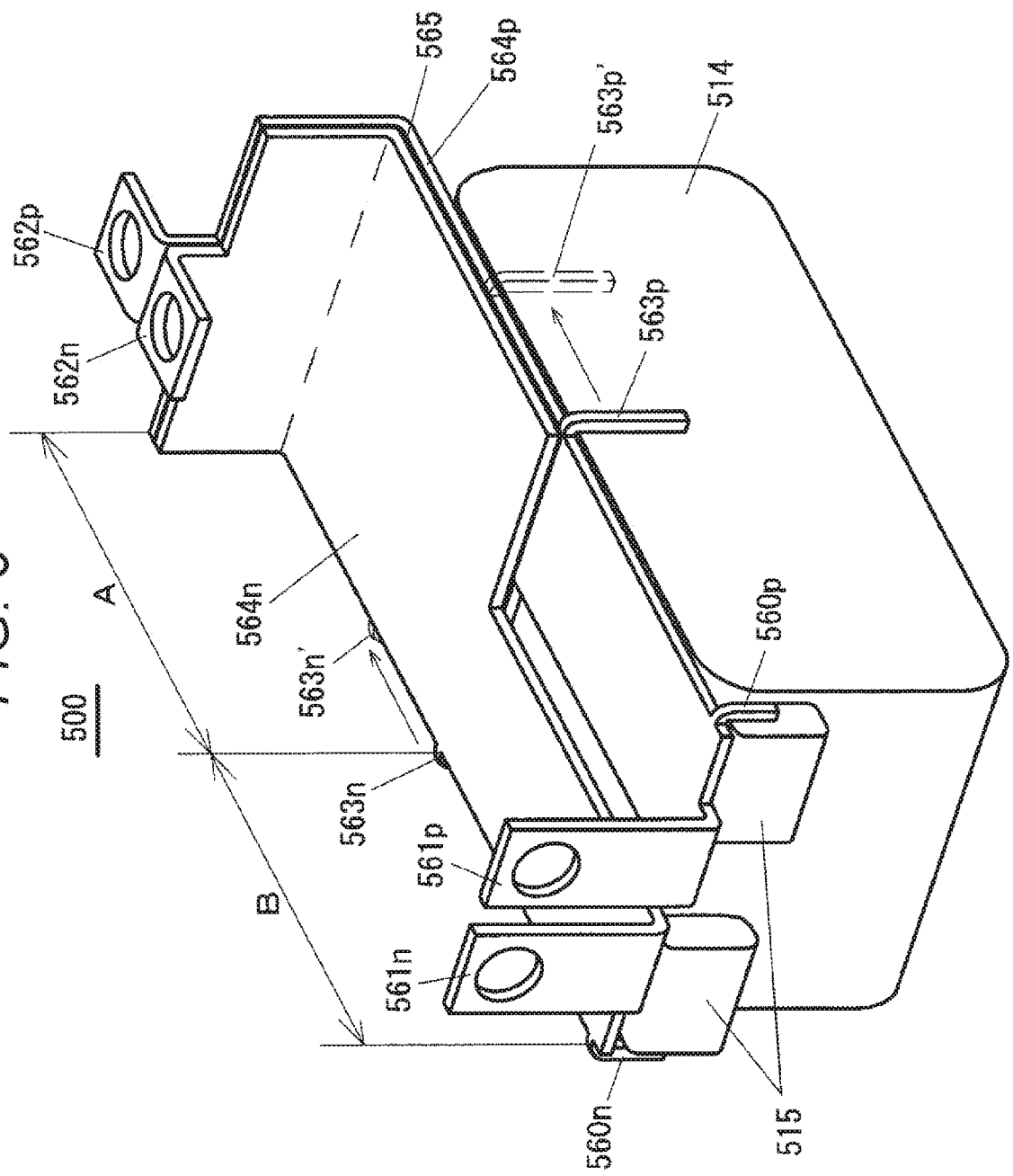
FIG. 6 is a perspective view of a capacitor module 500 in a first embodiment.
Figure 7:
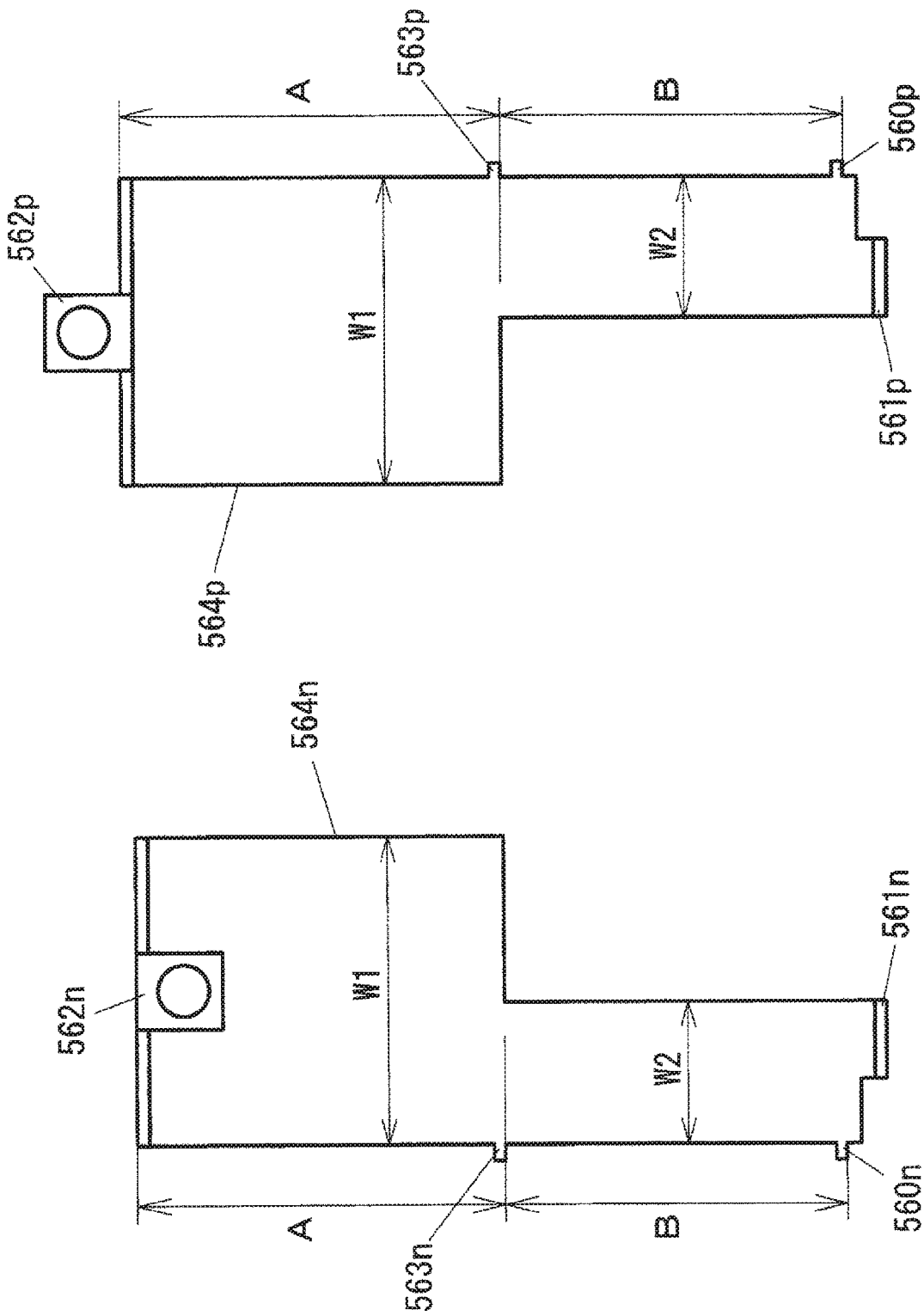
FIG. 7 individually illustrates plan views of conductors 564p and 564n.

FIGS. 6 and 7 illustrate a first embodiment of the conductors 564p and 564n. FIG. 6 is a perspective view of the capacitor module 500. On the other hand, FIG. 7 illustrates plan views of each of the conductors 564p and 564n. The conductors 564p and 564n have a plate shape. Here, both of wide front and back surfaces disposed in a thickness direction is called a main surface.

In the conductor 564p, a power side terminal 562p is formed on one end, and a power source side terminal 561p is formed on another end. In addition, the conductor 564p includes the capacitor terminal 563p as a connecting portion connected to a positive electrode side of the capacitor 514 and the capacitor terminal 560p as a connecting portion connected to a positive electrode side of the capacitor 515. In the conductor 564p, a region A is a laminated region. The region A and the main surface of the conductor 564n are laminated so as to face each other in the laminated region. On the other hand, a region B of the conductor 564p is a non-laminated region which is not laminated with the conductor 564n (refer to FIG. 6). Specifically, in the non-laminated region B, main surfaces of the conductors 564p and 564n are not faced. A width W2 of the non-laminated region B is set to be smaller than ½ of a width W1 of the laminated region A. In the laminated region, an insulating member 565 (for example, an insulating paper) is sandwiched to electrically insulate the conductor 564p and the conductor 564n.

In the conductor 564n, a power side terminal 562n is formed at one end, and a power source side terminal 561n is formed on another end. In addition, the conductor 564n includes the capacitor terminal 563n as a connecting portion connected to a negative electrode side of the capacitor 514 and the capacitor terminal 560n as a connecting portion connected to a negative electrode side of the capacitor 515. In the conductor 564n, a region A is a laminated region in which the region A and the main surface of the conductor 564p are laminated so as to face each other, and a region B is a non-laminated region in which the region B is not laminated with the conductor 564p (refer to FIG. 6).

The capacitor module 500 is stored in a capacitor case, and the capacitor case is filled with a filler, although it is not illustrated in FIG. 6.

Figure 8:
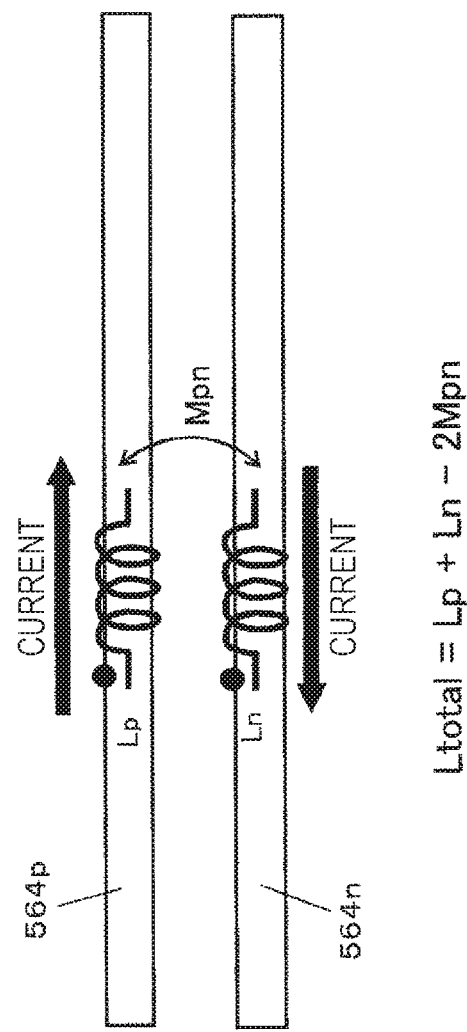
FIG. 8 is a view describing an inductance in a laminated structure.

As illustrated in FIG. 6, the conductors 564p and 564n includes a laminated region A between the capacitor terminals 563p and 563n and the power side terminals 562p and 562n and a non-laminated region B between the capacitor terminals 563p and 563n and the capacitor terminals 560p and 560n. As illustrated in FIG. 8, in the case where the conductors 564p and 564n having parasitic inductances Lp and Ln respectively are laminated each other, directions of current flowing in the conductors 564p and 564n are opposite each other. Therefore, a total inductance Ltotal is decreased by (−2 Mpn) for a mutual inductance Mpn. Therefore, the parasitic inductance L2 of the laminated region A in FIG. 6 is decreased, and a surge voltage can be suppressed.

On the other hand, in the case where the conductors 564p and 564n are laminated as in the non-laminated region B illustrated in FIG. 6, the mutual inductance Mpn is substantially decreased, and the total inductance Ltotal is indicated approximately by Ltotal=Lp+Ln. As a result, in comparison with a case using a laminated structure, the parasitic inductance L1 can be increased, and noise flowing from an input of a power converter can be reduced.

A length from the capacitor terminals 563p and 563n to the power side terminals 562p and 562n is preferably as short as possible from the aspect of reducing the parasitic inductance L2. For example, when the capacitor terminals 563p and 563n are disposed near the power side terminals 562p and 562n as indicated by 563p' and 563n', the parasitic inductance L2 can be further decreased, and the parasitic inductance L1 can be further increased. In this case, at least a part of the conductors 564p and 564n is the non-laminated region B between the capacitor terminals 563p' and 563n' and the capacitor terminals 560p and 560n.

Second Embodiment

Figure 9:
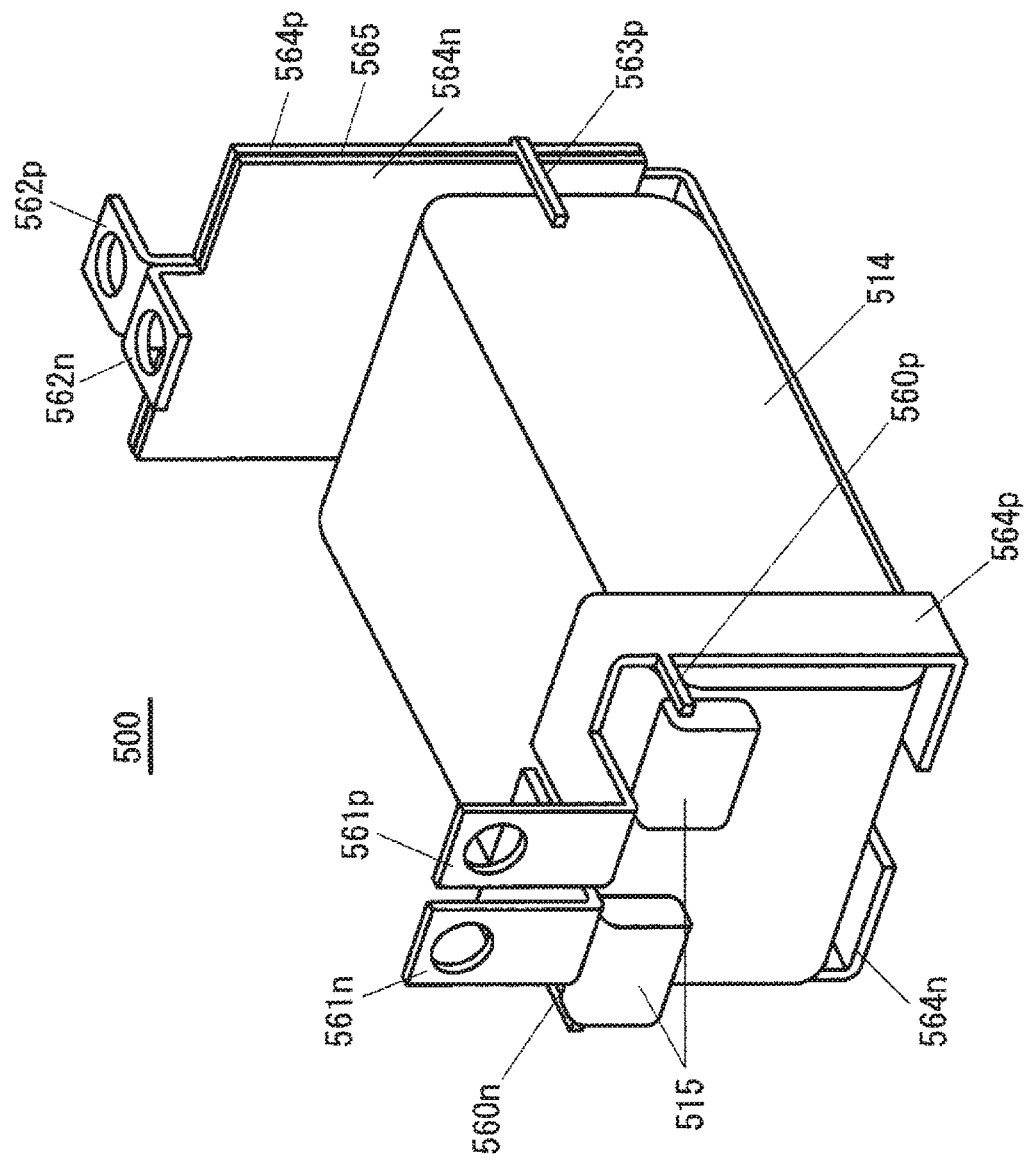
FIG. 9 is a perspective view of a capacitor module 500 in a second embodiment.
Figure 10:
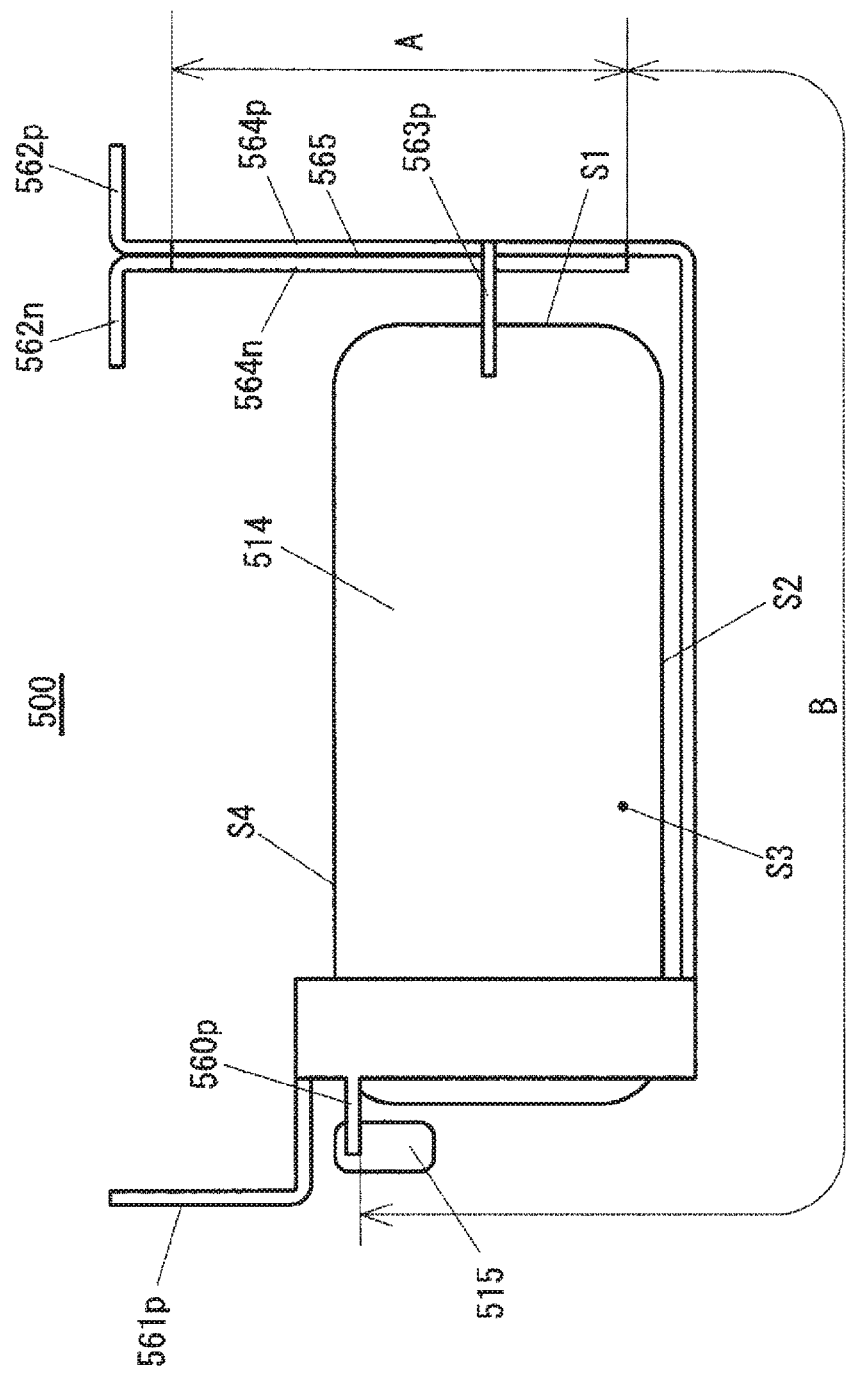
FIG. 10 is an elevation view of the capacitor module 500 illustrated in FIG. 9.
Figure 11:
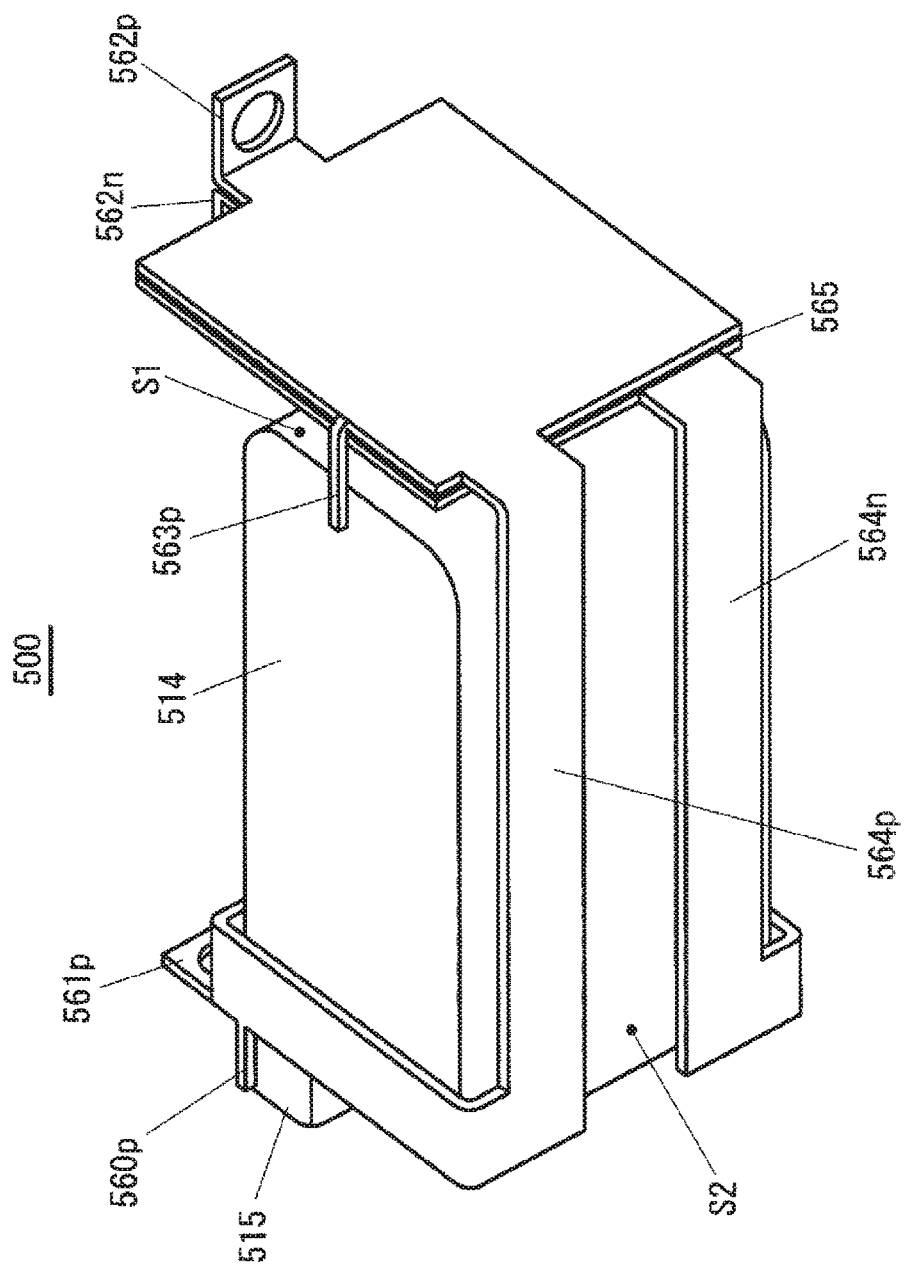
FIG. 11 is a perspective view viewed from a bottom surface side of the capacitor module 500 illustrated in FIG. 9.

FIGS. 9 to 11 illustrate a second embodiment of the conductors 564p and 564n. FIG. 9 is a perspective view of a capacitor module 500, and FIG. 10 is an elevation view thereof. FIG. 11 is a perspective view viewed from a bottom surface side of the capacitor module 500 illustrated As in the case of FIG. 6, the capacitor 514 disposed to the capacitor module 500 has a substantially rectangular parallelepiped shape having six side surfaces.

In the second embodiment, an parasitic inductance L1 is increased by extending the length of a conductor between capacitor terminals 563p and 563n and capacitor terminals 560p and 560n. Therefore, in the above-described FIG. 7, the conductors 564p and 564n are provided along one side surface of the capacitor 514. However, in the second embodiment, as illustrated in FIG. 11, the conductors 564p and 564n are extended along four side surfaces of the capacitor 514, and the length of a region in which the conductors 564p and 564n are laminated (a laminated region A) is set to be shorter than the length of a region in which the conductors are not laminated (a non-laminated region B). Specifically, as illustrated in FIG. 10, a portion facing to a side surface S1 has a laminated structure (the laminated region A), and a portion facing to side surfaces S2, S3, and S4 has a non-laminated structure (the non-laminated region B).

As described above, the parasitic inductance L1 can be further increased by extending a length of the non-laminated region B while setting a size of the capacitor module 500 to almost same as the size in FIG. 7 by extending the conductors 564p and 564n along a plurality of the side surfaces S1 to S4 of the capacitor 514. In the examples illustrated in FIGS. 9 to 11, the capacitor terminals 563p and 563n are disposed in a middle of the laminated region A. However, as in the case illustrated in FIG. 7, the capacitor terminals may be disposed at an end of a non-laminated region side in the laminated region A.

In comparison with the configuration illustrated in FIG. 7, the parasitic inductance L2 is a same level, and the parasitic inductance L1 is approximately 7.5 times. As a result, voltage fluctuation in the power source side terminals 561p and 561n is reduced to approximately ½.

Third Embodiment

Figure 12:
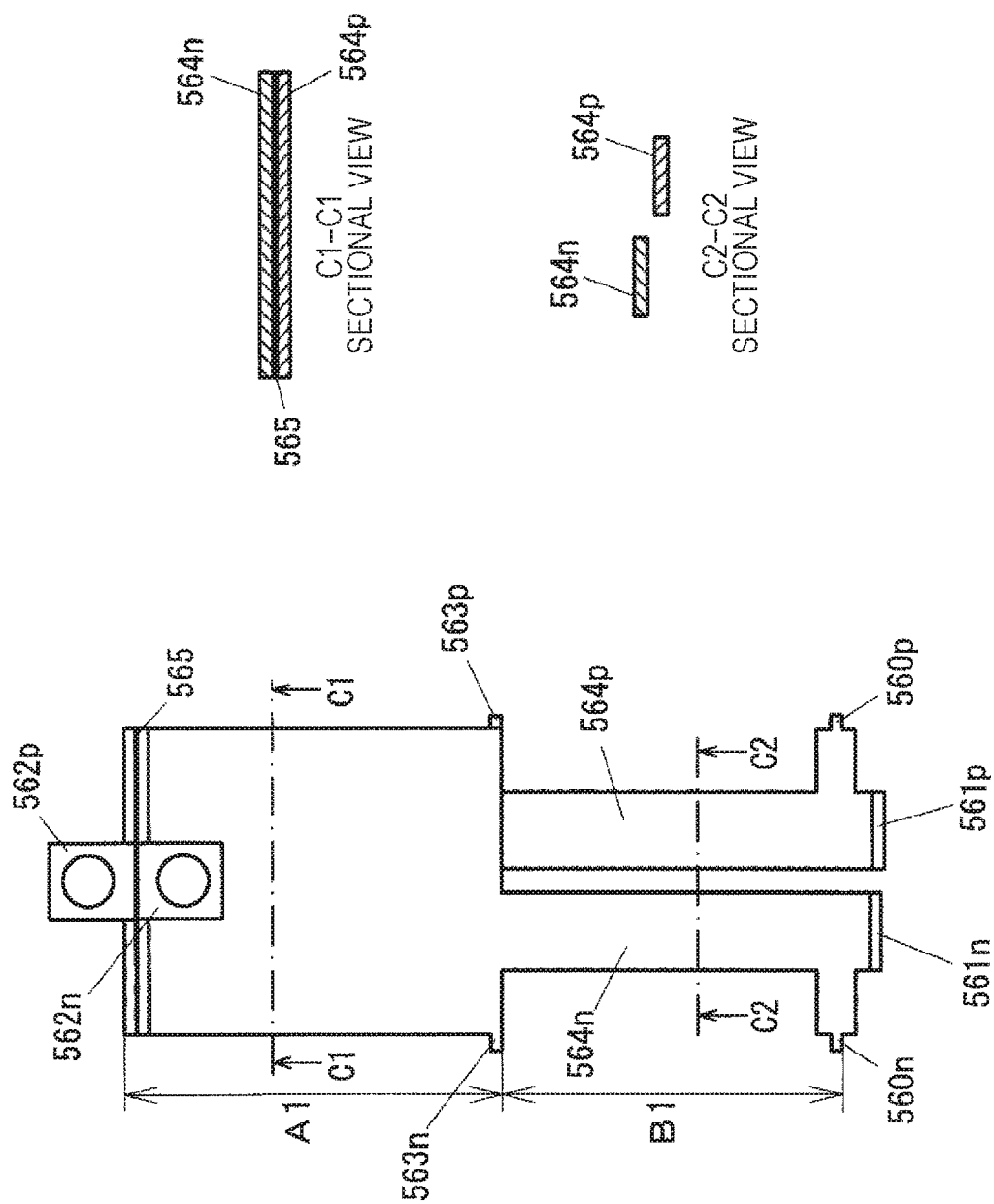
FIG. 12 illustrates conductors 564p and 564n in a third embodiment.

FIG. 12 illustrates conductors 564p and 564n in a third embodiment. In the third embodiment, as a method for setting parasitic inductances L1 and L2 to be L1>L2, conductor sectional areas are varied. More specifically, sectional areas (a C2-C2 sectional area) of the conductors 564p and 564n between capacitor terminals 563p and 563n and capacitor terminals 560p and 560n are set to be smaller than sections areas (a C1-C1 sectional area) of the conductors 564p and 564n between the capacitor terminals 563p and 563n and the power side terminals 562p and 562n. Sizes of the sectional areas are adjusted by changing widths W1 and W2 and conductor thickness.

A length in an extending direction (a current flowing direction) of the conductor is almost equal in regions A1 and B2. Therefore, the parasitic inductances L1 and L2 in the case of considering the conductors 564p and 564n separately is set to be L1>L2 by setting a sectional area as described above. In the example illustrated in FIG. 12, in the region A1, the conductors 564p and 564n have a laminated structure. Therefore, the parasitic inductance L2 is further reduced.

As described above, according to the embodiment, in the conductors 564p and 564n provided in a power converter 200, the power side terminals 562p and 562n provided at one end are connected to an inverter circuit 140, and power source side terminals 561p and 561n provided to another end are connected to a battery 136. In addition, the power converter 200 includes the capacitor terminals 563p and 563n provided on a power side terminal 562p and 562n side and connected to a capacitor 514 for smoothing and the capacitor terminals 560p and 560n provided on a power source side terminal 561p and 561n side and connected to a capacitor 515 for removing noise.

The conductors 564p and 564n are formed such that the parasitic inductance L1 between the capacitor terminals 563p and 563n and the capacitor terminals 560p and 560n is larger than the parasitic inductance L2 between the capacitor terminals 563p and 563n and the power side terminals 562p and 562n.

Generally, as described in PTL 1, the conductors 564p and 564n are formed such that a parasitic inductance of an entire conductor becomes small to suppress generation of a surge voltage. However, noise flowing from an input of a power changer is not considered. Specifically, in the case where the parasitic inductances of the entire conductors 564p and 564n are lowered, a surge voltage is reduced. However, effects to suppress the noise outflow caused by the surge voltage cannot be expected.

Therefore, in the embodiment, first, the parasitic inductances L2 between the capacitor terminals 563p and 563n and the power side terminals 562p and 562n which cause a surge voltage are reduced to suppress a surge voltage. Further, by increasing the parasitic inductances L1 between the capacitor terminal 563p and 563n and the capacitor terminal 560p and 560n, noise flowing from an input of a power converter causing a surge voltage is reduced.

As illustrated in FIG. 6, a method for setting the parasitic inductance to be L1>L2 includes that the parasitic inductance L2 is decreased by having a laminated structure in the laminated region A of the conductors 564p and 564n, and the parasitic inductance L1 is increased by having a non-laminated structure in the non-laminated region B. Further, as illustrated in FIG. 12, the parasitic inductance is set to be L1>L2 by reducing a conductor sectional area in the region A1 in comparison with a conductor sectional area in the region B1. In addition, both of the laminated/non-laminated structures and sectional relations may be used.

Further, as well as using the laminated/non-laminated structures or the sectional relations, as illustrated in FIGS. 9 to 11, the parasitic inductance L1 may be increased by extending lengths of the regions B and B1 (non-laminated portions or portions having a small sectional area) by extending the conductors 564p and 564n along the plurality of side surfaces of the capacitor 514.

Each of the above-described embodiments may be used individually or by combination. This is because effects in each embodiment can be obtained individually or synergically. In addition, the present invention is not limited to the above-described embodiments as long as characteristics of the present invention are not impaired.

REFERENCE SIGNS LIST 136 battery
140 inverter circuit
156, 166 diode
200 power converter
300 power module
328, 330 IGBT
500 capacitor module
514, 515 capacitor
560n, 560p, 563n, 563p capacitor terminal
561n, 561p power source side terminal
562n, 562p power side terminal
564n negative electrode conductor
564p positive electrode conductor
565 insulating member
L1, L2 parasitic inductance
MG1, MG2 rotary electric machine

The invention claimed is:

1. A power converter comprising:
a power conversion circuit including a plurality of semiconductor switching elements;
a smoothing capacitor configured to smooth DC power from a DC power source; and
a conductor configured to conduct the DC power from the DC power source to the power conversion circuit, wherein
the conductor includes:
a power source side terminal configured to be connected to the DC power source;
a power side terminal connected to the power conversion circuit; and
a first capacitor terminal connected to the smoothing capacitor and formed at a position so that a first parasitic inductance between the first capacitor terminal and the power source side terminal is larger than a second parasitic inductance between the first capacitor terminal and the power side terminal.

2. The power converter according to claim 1, wherein
the conductor has a first portion with a first width between the first capacitor terminal and the power side terminal, and
the conductor has a second portion with a second width narrower than the first width between the first capacitor terminal and the power source side terminal.

3. The power converter according to claim 1, further comprising:
a Y-capacitor connected to a ground,
wherein the conductor includes a second capacitor terminal connected to the Y-capacitor and formed between the first capacitor terminal and the power source side terminal.

4. The power converter according to claim 3, wherein
a third parasitic inductance between the first capacitor terminal and the second capacitor terminal is larger than the second parasitic inductance.

5. The power converter according to claim 3, wherein
the conductor has a first portion with a first width between the first capacitor terminal and the power side terminal, and
the conductor has a second portion with a second width narrower than the first width between the first capacitor terminal and the second capacitor terminal.

6. A power converter comprising:
a power conversion circuit including a plurality of semiconductor switching elements;
a smoothing capacitor connected in parallel with the power conversion circuit; and
a conductor configured to conduct the DC power from a DC power source to the power conversion circuit, wherein
the conductor includes:
a power source side terminal configured to be connected to the DC power source;
a power side terminal connected to the power conversion circuit; and
a first capacitor terminal connected to the smoothing capacitor and formed at a position so that a first parasitic inductance between the first capacitor terminal and the power source side terminal is larger than a second parasitic inductance between the first capacitor terminal and the power side terminal,
wherein the conductor has a laminated portion between the first capacitor terminal and the power side terminal, and
wherein the conductor has a non-laminated portion between the first capacitor terminal and the power source side terminal.

7. The power converter of claim 1, wherein:
the conductor has a first portion with a first length between the first capacitor terminal and the power side terminal, and
the conductor has a second portion with a second length between the first capacitor terminal and the power source side terminal, wherein the second length is shorter than the first length.

8. The power converter of claim 1, wherein:
the conductor comprises a positive line and a negative line;
the smoothing capacitor is connected in parallel with the DC power source; and
the smoothing capacitor is connected so that it is the closest capacitor connected in parallel to the DC power source that has a connection terminal on the positive line and a connection terminal on the negative line.

* * * * *